United States Patent [19]
Parker et al.

[11] Patent Number: 5,471,296
[45] Date of Patent: Nov. 28, 1995

[54] CAMERA LENS CONTROL SYSTEM AND METHOD

[75] Inventors: Jeffrey L. Parker; David F. Sorrells; John D. Mix, all of Jacksonville, Fla.

[73] Assignee: ParkerVision, Inc., Jacksonville, Fla.

[21] Appl. No.: 78,434

[22] Filed: Jun. 16, 1993

Related U.S. Application Data

[63] Continuation-in-part of Ser. No. 530,999, May 31, 1990, Pat. No. 5,268,734, and a continuation-in-part of Ser. No. 736,729, Jul. 26, 1991, abandoned.

[51] Int. Cl.⁶ .............................. G01B 11/26; G01J 1/20; H04N 5/225; G05B 1/06
[52] U.S. Cl. .................... 356/139.06; 250/203.3; 250/206.1; 318/640; 348/213; 352/179; 356/141.2
[58] Field of Search .......................... 356/139.06, 141.2; 318/640; 250/203.3, 206.1; 352/53, 179; 348/169, 213

[56] References Cited

U.S. PATENT DOCUMENTS

| | | |
|---|---|---|
| 4,239,356 | 12/1980 | Freudenschuss . |
| 4,905,315 | 2/1990 | Solari et al. ............................ 318/640 |
| 4,945,367 | 7/1990 | Blackshear ................................ 354/81 |
| 4,974,088 | 11/1990 | Sasaki . |
| 4,998,125 | 3/1991 | Watanabe et al. ...................... 354/403 |
| 5,012,335 | 4/1991 | Cohodar . |
| 5,068,735 | 11/1991 | Tuchiya et al. . |
| 5,073,824 | 12/1991 | Vertin . |
| 5,278,643 | 1/1994 | Takemoto et al. . |

*Primary Examiner*—Stephen C. Buczinski
*Attorney, Agent, or Firm*—Arthur G. Yeager

[57] ABSTRACT

The system includes distance measuring capability for use in the local and remote control of a camera lens for automatic and programmable control of ZOOM perspective, FOCUS, IRIS and other functions of the camera in conjunction with the programming of an included microcomputer-controlled automatic tracking system.

34 Claims, 12 Drawing Sheets

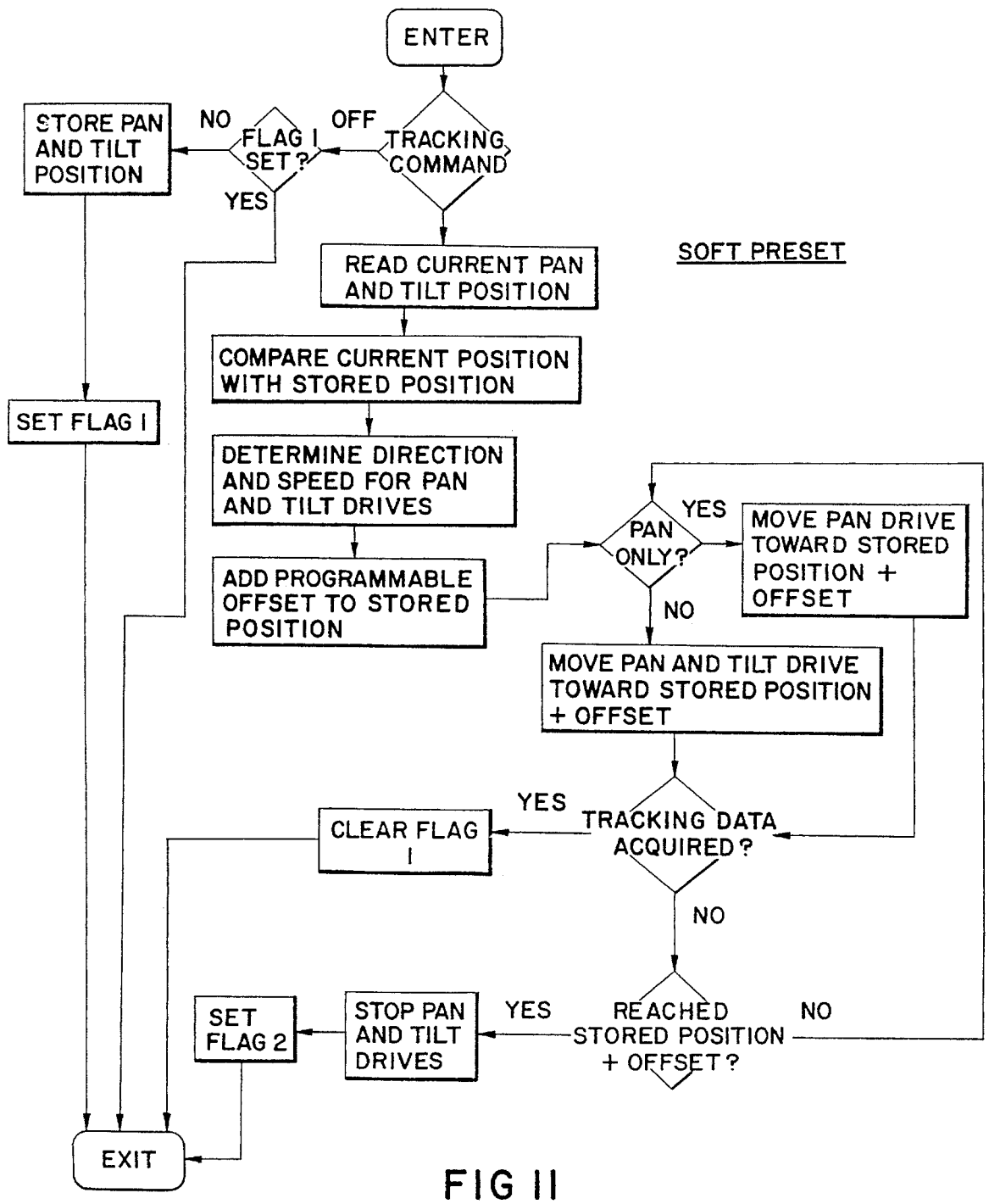
FIG II

CAMERA LENS CONTROL SYSTEM AND METHOD

CROSS REFERENCE TO RELATED APPLICATION

This is a continuation-in-part of application Ser. No. 07/530,999, filed May 31, 1990, now U.S. Pat. No. 5,268,734, entitled "REMOTE TRACKING SYSTEM FOR MOVING PICTURE CAMERA AND METHOD"; AND "REMOTE CONTROLLED TRACKING SYSTEM FOR TRACKING A REMOTE CONTROL UNIT AND POSITIONING AND OPERATING A CAMERA AND METHOD", Ser. No. 07/736,729, filed Jul. 26, 1991, now abandoned. This application is related to U.S. Pat. No. 5,179,421, dated Jan. 12, 1993, entitled "TRACKING SYSTEM FOR MOVING PICTURE CAMERAS AND METHOD"; and Ser. No. 07/875,078, filed Apr. 28, 1992, now abandoned, entitled "A REMOTE-CONTROLLED TRACKING SYSTEM FOR TRACKING A REMOTE CONTROL UNIT AND POSITIONING AND OPERATING A CAMERA AND METHOD".

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to controls of the lens apparatus of a camera and particularly to the coordination of lens operation with a remote-controlled automatic tracking system that includes distance-measuring capability.

2. Prior Art

Apparatus for automatic tracking of subjects is well known in the prior art and includes the systems described in the above-referenced applications. Distance-measuring devices are also known to the art and usually employ triangulation or ultrasonic ranging both of which are complex and expensive and in the case of ultrasound, subject to wide variations in accuracy. Lens control systems are of course well known to the art.

While the tracking systems, distance-measuring apparatus, and lens control systems known to the prior art may be satisfactory in their own applications the prior art is deficient in any system that combines all of the capabilities of these three fields of camera technology into an integrated whole. The present invention provides such capability and provides completely automatic control.

SUMMARY OF THE INVENTION

In one aspect of the present invention there is provided a method of automatically controlling the field of view of a camera relative to a subject which includes the steps of: automatically identifying the subject; determining the relationship of the subject to the field of view of the camera; and automatically controlling the field of view of the camera in response to the determined relationship. The method preferably includes determining the distance between the subject and the camera. Other steps may include establishing desired fields of view with respect to the distance between the subject and the camera; automatically controlling the field of view to automatically maintain the desired fields of view established; automatically tracking the subject in at least one plane with the field of view; automatically issuing a command to select a desired field of view; issuing the command by the subject; establishing and remembering a plurality of fields of view; and issuing a command to recall and maintain one of the desired fields of view remembered.

Another aspect of the present invention includes a method of automatically controlling the focus of the field of view of a camera relative to a subject which includes the steps of: automatically identifying the subject; establishing a desired focus relative to the subject; and automatically controlling the focus of the field of view in response to a determined relationship. Additional steps preferably include determining the distance between the subject and the camera. Other steps may include automatically tracking the subject in at least one plane with the desired field of view; issuing the command by the subject; establishing and remembering a plurality of focus settings; and issuing a command to recall and maintain one of the desired focus settings remembered.

A further aspect of the present invention includes the combination of steps providing for a remembered focus for each remembered field of view and the recall of these functions by command.

An additional aspect of the present invention provides the steps of establishing references by which a subject's position with respect to the field of view is defined; determining the actual error of the subject with respect to the field of view of the camera; establishing a desired location of the subject with respect to the field of view of the camera; and automatically controlling the field of view of the camera to maintain the subject at the desired location with respect to the field of view.

Further steps include: establishing a plurality of tracking zones wherein each tracking zone is defined by an error measured from a desired location of the subject relative to the field of view; establishing a specific rate at which the error between the subject and the desired location is reduced in each tracking zone established; automatically adjusting the tracking zones to maintain a desired tracking zone area relative to the subject independent of distance; automatically controlling the rate at which the error is reduced within each tracking zone; and maintaining the highest error reduction rate associated with a tracking zone that the subject has entered until the error has been substantially eliminated.

The present invention also provides a method of automatically controlling the field of view of a camera relative to a subject within the field of view of the camera which includes: determining the relationship of the subject of the field of view of the camera; establishing a plurality of desired fields of view; controlling the field of view to provide and maintain the desired fields of view established; determining the actual location of the subject with respect to the field of view of the camera; establishing a desired location of the subject with respect to the field of view of the camera; and controlling the field of view of the camera to automatically track the subject by reducing the error in position in the field of view between the actual location determined and a desired location established. Other steps may include establishing a tracking zone for each of the fields of view established wherein each tracking zone is defined by an area measured in terms of distance and angle from a reference that represents a desired location of the subject relative to the field of view established; establishing a specific rate at which the error in position between the subject and the field of view is reduced in each tracking zone established for a respective field of view; selecting a desired field of view established; automatically selecting a tracking zone for the selected field of view; automatically tracking the subject with the field of view of the camera; and reducing the error at the rate established for the selected tracking zone.

The present invention also provides a method of automatically controlling the control functions used in a system that controls the field of view of a camera comprising the steps of: automatically determining the error of a subject relative to a reference; automatically determining the relationship between the subject and the field of view; selecting which of one or more control functions used for the control of the system and control of the camera field of view are to be automatically changed in response to changes in an independent function related to a dependent function establishing a relationship between the independent and dependent function selected that determines how the dependent control functions are to be changed in response to changes in the independent function; and automatically controlling one or more dependent control functions in response to changes in the independent function in accordance with the respective relationship established. The control functions are selected from the following list: camera field of view; camera focus; camera iris; tracking window size in PAN and/or TILT plane; tracking sensitivity; angular tracking range; override speed in PAN and/or TILT plane; framing; angular tracking zone; and distance.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 11 is a flow chart for the soft preset programming of the present invention;

DETAILED DESCRIPTION OF THE PREFERRED EMBODIMENT INTRODUCTION

Figure 1:
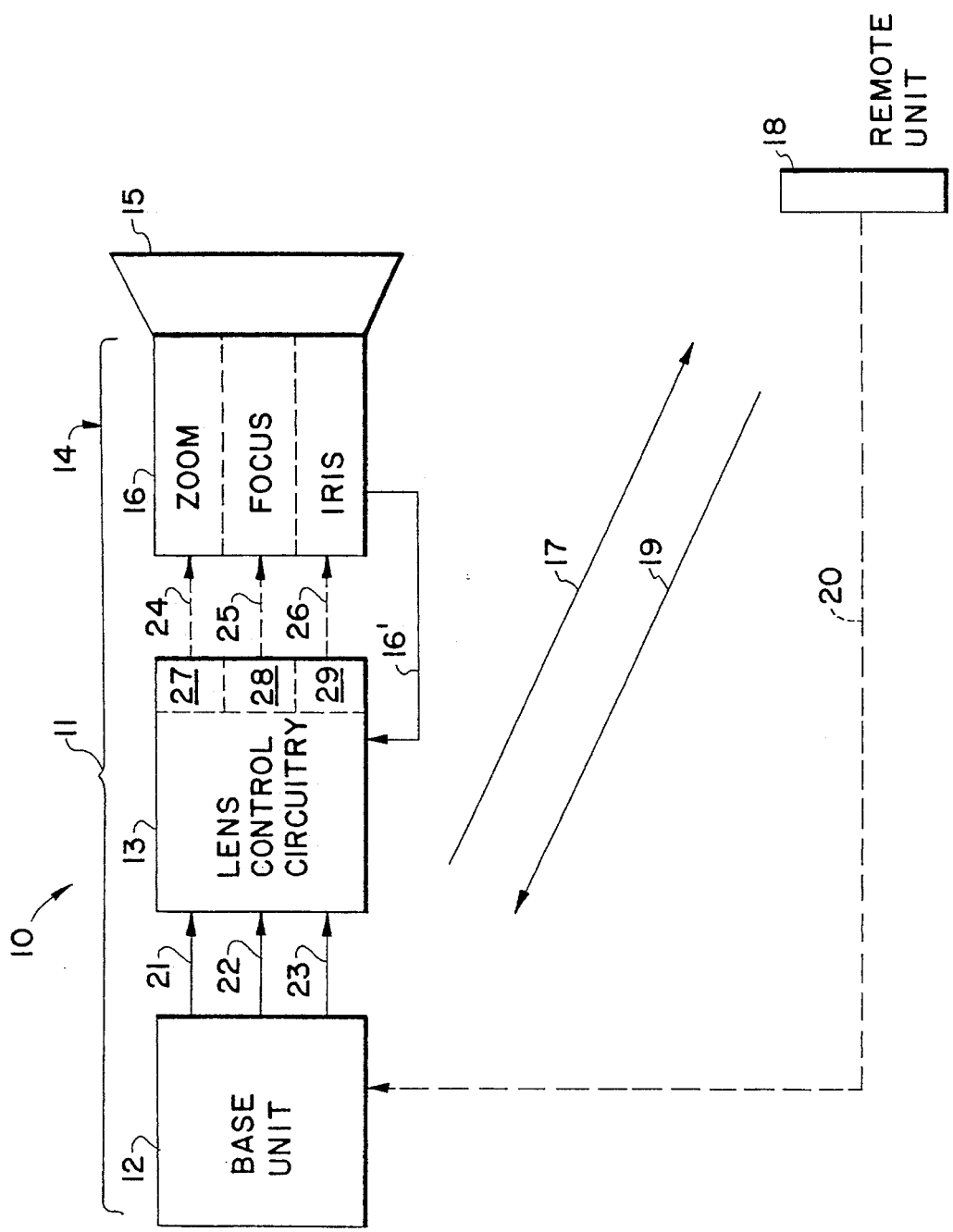
FIG. 1 is a pictorial description of the major components of the present invention.

The present invention is a remote tracking system and method particularly for applications which require remote control of the field of view of a moving picture camera such as video camcorders.

A brief review of the design and operation of the prior applications Ser. Nos. 07/530,999; 07/736,729; and 07/875,078 will be helpful in explaining the lens control system described herein.

The base unit of the tracking system transmits an infrared signal through a rotating set of lenses or signal shapers designed to structure the IR beam in a predetermined process. The base unit includes a microprocessor which monitors indicating circuitry to calculate the error from exact alignment between the base unit and the remote unit. The remote unit transmits an RF signal to the base unit containing information regarding the received IR signal, particularly the instantaneous strength of the signal. The base unit contains computational circuitry to calculate the angle of the structured IR beam relative to the reference angle, usually 0 degrees or exact alignment. When the received IR signal strength reaches a maximum or "peak" value, the angle of the IR beam relative to the reference angle will be determined by the base unit circuitry.

The remote unit in the present invention is preferably in the form of a lavaliere or brooch configured to be worn by the subject which includes audio circuitry and the capability of utilizing either internally or externally mounted IR sensors. The remote unit can transmit infrared tracking information or other IR signal data to the base unit as well as "Commands". The system also employs electronic means to operate the camera controls.

Other features include a PAN and TILT position indicator employing an optical disk that rotates through an optical detection system to monitor actual position. The preferred embodiment of the present invention employs an optical disk position indicator that provides an absolute position output signal rather than relative movement. This is accomplished by employing an encoded light blocking array pattern on the disk which then provides an output to computational circuitry for use in system operation.

The electronics of the base unit is substantially similar to that illustrated in Ser. No. 07/530,999; 07/736,729 and 07/875,078. The lavaliere configuration of the remote unit will be further discussed in this application.

TILT and PAN IR signals are transmitted through their respective optics which have zero reference planes aligned with the horizontal and vertical center lines of the camera field of view. Adjustments are provided to align the field of view of a particular camera with the reference lines.

A command keypad on the remote unit includes a plurality of keys for a group of command functions which include the following: (1) a START/STOP button for the camera ON/OFF function; (2) an AUTO TRACK button to set automatic tracking ON/OFF; (3) a Zoom rocker switch used to control ZOOM WIDE and ZOOM TIGHT for the camera ZOOM lens; and (4) LOCATION PRESET buttons used to set locations of PRESET by using PAN/TILT OVERRIDE buttons to move to a particular field of view of camera or by simply tracking to a particular field of view. Pressing the SET button and then a PRESET number button will result in the remembering of the selected field of view. The data from position indicator circuitry at the selected presets is then stored into the memory of controller and can be recalled by depressing the appropriate button. The recall to a preset location will automatically override the tracking function and position the base unit according to the stored data. The camera can then be operated as desired. (5) The PAN/TILT OVERRIDE buttons provide Direction of Movement commands which are used for manual control of respective functions in conjunction with FAST and SLOW speed control switches. (6) The STEALTH ON/OFF button is used with a STEALTH function for cases when a user will walk behind a barrier that will break IR communication between remote and base unit. As explained previously, the RF return signal includes data regarding the IR signal strength in the form of infrared tracking information for the received PAN and TILT signals. When STEALTH button is operated "on" and held depressed, a COMMAND signal is sent to base unit which, via stored software in ROM, will provide that the base unit will continue moving at the same rate and in the same direction. Circuit data on movement direction and speed is stored in the memory circuits of controller.

Software for the operation of the system is placed in ROM and includes programs for response of the base unit to commands from the wand and the complete autotracking functions of the system including location presets and the operation of all controls associated with the camera.

The automatic tracking of the remote unit by the base unit is controlled via the AUTOTRACK command. Location preset position data from the PAN and TILT position feedback sensors circuitry is entered into the RAM and NOVRAM using the SET command. The recalling of a preset location while in autotracking mode will override automatic tracking which can then be restarted if desired by way of the AUTOTRACK command.

In the present invention, software in ROM includes functions for a CYCLE mode whereby the base unit will automatically move from the first location preset to the others (that have been remembered) and then repeat this action. During the CYCLE mode, the base unit will be positioned at each preset point for an adjustable hold time. In addition, the speed at which the base unit moves from one preset to another is adjustable by Speed commands in ten steps with 10 being the fastest and 1 being the slowest. Speed is adjusted by depressing SET switch and then depressing the SLOW switch (to decrease speed) or the FAST switch (to increase speed). With both switches held down, the simultaneous release of both switches will change the speed by one increment as desired.

The CYCLE mode is initiated by depressing and holding down the START/STOP switch and a SET switch. Once in the CYCLE mode depressing and releasing both the switches will result in the transmission of a CEASE CYCLE MODE command.

The ultimate control of the motors is under PID control loop algorithms stored in controller ROM. As understood in the art, "P" is a variable equal to a proportional control error subtracted from the previous error with this new error multiplied by a "gain" variable. "I" is equal to a integral control calculation which is determined by the current error value multiplied by a second "gain" variable. "D" is equal to a derivative control calculation which consists of the output of the current proportional term subtracted from the previous calculation and multiplied against a third "gain" variable. P, I, and D are added together and constitute an output control signal that is scaled by the microprocessor for the specific hardware employed in the application. The PID gains are adjustable when the user selects different tracking responses as will be described hereinbelow.

The specific tracking response is controlled via software placed in ROM which adjusts the gain variables as appropriate to a particular application. The "ramping" up and down to accomplish different motor speed responses is also fixed in the software.

For example, the system uses a PID positioning algorithm to control the PAN and TILT motor response to provide for movement between presets without overshoot to be accomplished in the shortest possible time. The controller has access to the instantaneous PAN and TILT position data (continuous feedback) and the desired PAN and TILT position. Accordingly, the speed of motors can be changed in response to the calculated error signals derived by the controller.

When established, these motor speed controls are used when (1) moving to a location preset from tracking; (2) moving from one location preset to another; and (3) moving between presets in the cycle mode.

The system determines the error that exists between the actual position of the PAN and TILT reference planes of the base unit from PAN and TILT position circuitry and the relative position of the remote unit with respect to the same reference planes. This error can be calculated in terms of degrees of angular deviation between the two positions or it can be expressed in more abstract terms, such as clock counts, if desired. Motor speed can then be determined and the base unit moved to eliminate the error.

The present invention includes, among other things, refinements to the tracking response that are stored in ROM. The tracking response adjustment is the rate at which the base unit is moved to eliminate the error between the unit and the remote unit and it is adjustable via commands from the remote. The system also includes software for an AUTOFIND function in order to locate the wand. To actuate AUTOFIND, the TRACK switch is depressed and held down. Then a PAN or TILT arrow switch is depressed. When both switches are released, the base unit will pan or tilt in the direction indicated until the wand is in the field of view of the base unit at which time the AUTOTRACKING function will resume. AUTOFIND is also terminated if the base unit is not located in either 380 degrees of movement or a predetermined time period (40 seconds) whichever occurs first.

The system may include an ACTION/DRAMA switch which provides for two different tracking response command techniques. First, in the ACTION position, the base unit will be moved to eliminate the position error as it occurs as discussed above. Second, in the DRAMA position different options are available. In one option, the software establishes a number of "windows" within the tracking area. The windows vary in size (as measured in degrees or amount of error from PAN and TILT reference planes) with a larger window containing a smaller one. Because the smaller window represents points that are within a smaller value of error, a slower tracking response may be selected. Several additional refinements may be selected. For example, as the error gets larger when the subject moves out of a smaller window, the tracking response gets faster. However, as movement of the base unit reduces the error, the response will remain at the response for the largest window in which the subject was present until the base unit movement has substantially eliminated the error. In the second option, the smallest window can be selected to represent no autotracking and accordingly, the base unit will move only when the subject moves into a larger window and then move base unit to substantially eliminate the error.

In order to facilitate automatic PID gain changes the system employs a PID gain "ramping" function. The gains are changed or ramped-up over a predefined time period. This refinement provides a smooth tracking response with no overshoot as the system parameters are changed by the user or automatically adjusted by the system.

Software is also included in ROM for the determination of whether tracking is possible in both the PAN and TILT directions. Preferably, autotracking is not enabled if the base unit cannot simultaneously track in both the PAN and TILT functions due to a lack of tracking signals in either plane. Autotracking will be used when the tracking signals are present and the autotrack function has been selected. In addition, programs in DRAMA mode provide for "crossover" control, that is movement back and forth from a zero error position into two "error zones", each defined by the respective zero reference planes 27 and 28. These programs provide for no base unit 11 movement during the automatic tracking mode if "crossover" or the "crossover and return" occurs within a predetermined time period which, preferably, is 1 second. This program also prevents unnecessary movement of the base unit and provides a smoother picture recording.

In either mode, the autotrack algorithm is stored in ROM and operates to track the remote unit if the angular error between the units is determined to exceed a preset number of degrees, hereby known as a window. The base unit will not move to correct the angular error if the subject is within the preset window. If the subject moves out of the preset window, the base unit will move to correct the error. When the error is less than a predetermined amount and the subject is not moving, the window will be reinstated and the base unit will cease movement until the error exceeds the predefined window. A dual window method utilizing a time-based ramp-up method of handling the transition between a stationary situation and the autotracking mode is also included. The PID gains are increased with time to the final selected values. In both cases the tracking response is reset to its initial value after the error has been substantially eliminated. Programming for greater tracking response (higher gains) as the subject moves into larger windows is provided. This particular approach can be used with any desired number of windows. The greatest response selected is maintained until the error is substantially eliminated. This method also includes the disabling of automatic tracking when the subject is within the smallest window. For a step change in tracking response as the subject moves into a larger window the response is increased continuously. This is preferred and is accomplished by monitoring the current error as compared to a previous error and increasing the response if the current error is greater than the previous error. This amounts to a second order PID algorithm due to real time-based/error-based changes in the PID gains. The tracking response change is preferably linear but could be exponential, logarithmic or otherwise as desired. The greatest response selected is maintained until the error is eliminated at which time it is reset to the initial value.

The present invention is directed towards the complete control of the lens of the camera and the coordination of lens control with the tracking functions of the base unit and the command functions of the remote unit.

DESCRIPTION OF THE SYSTEM

With reference to the drawings, a simplified block diagram of the invention is depicted at numeral 10 in FIG. 1. Base station 11 includes a movable base unit 12 onto which is mounted a camera 14. The base unit 12 includes circuitry by which remote unit 18 is tracked via a scanning signal 17. The remote unit 18 receives scanning signal 17 and sends to the base unit 12 a return signal 19. Base unit 12 will track the remote unit 18 and, via lens control circuitry 13, control the lens 15 of camera 14 and associated lens control apparatus 16.

Base unit 12 generates an IR scanning signal 17 that scans a given area for the remote unit 18. Remote unit 18 includes IR receiver circuitry which detects the signal 17 and provides an output that (1) increases; (2) reaches a "peak" corresponding to the maximum IR signal strength present; (3) decreases; and (4) remains above a preset threshold level for a determinable time. The return signal 19 will include data regarding the received IR signal 17 such that base unit 12 is supplied with a virtual replica of the received IR signal. Return signal 19 is preferably broadcast continuously with data placed therein by conventional circuitry well understood in the art. The return signal 19 is a transmitted RF signal. However, if desired in the circumstances, the return signal can be transmitted on a hardwired communications link 20 (as shown in FIG. 1) or transmitted in any form desired in the circumstances.

Camera control from the base unit 12 is illustrated in simplified form. Control signals 21, 22, 23 represent signals used for control of ZOOM, FOCUS, and IRIS respectively that are provided to lens control circuitry 13 which contains, among other things, ZOOM motor 27, FOCUS motor 28, and IRIS motor 29. The motors 27–29 are connected to the optics and other lens control apparatus 16 via respective connections 24, 25, 26, which connections may be mechanical or electronic depending upon the specific design of camera 14. Position feedback is represented by signal 16'. In this regard it is important to note that optical functions can be dealt with electronically in some CCD cameras. One of the principal objectives of the present invention is the control of the field of view of the camera which represents the selectable portion of the total image physically available to the camera that is supplied by the camera. That is, not everything within the physical range of the camera lens is necessarily "seen" by the camera at a particular time and camera lens then supplied as an output. The use of "zoom functions" that may require changes in the optical magnification of the camera lens is a case in point. The movement of a ZOOM lens into a "tighter" shot results in significantly less image "seen" by the camera with respect to the total image physically available at other lens positions. The present invention is directed to the control of the field of view of any type of image-receiving device and is adaptable to interface with the specific technology involved. Accordingly, while the present invention is directed towards standard video cameras such as camcorders, CCTV cameras and broadcast cameras, the system is easily applied to other camera technology.

Figure 2:
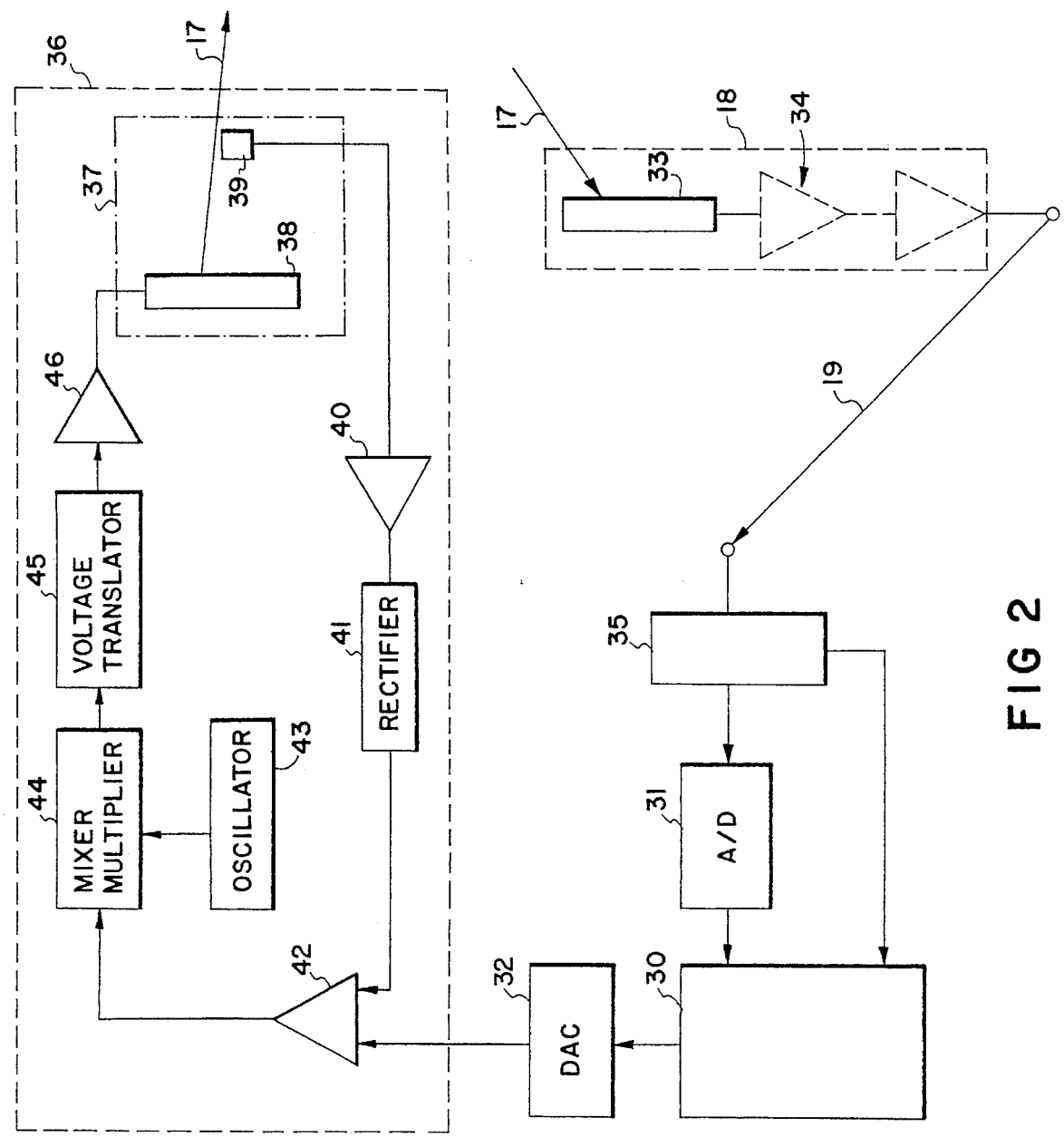
FIG. 2 is a block diagram of the distance-measuring system of the present invention.

FIG. 2 illustrates in block diagram form the distance-measuring capability of the present invention which is built around a microprocessor-based control system. Microprocessor 30 is interfaced to analog-to-digital (A/D) converter 31 and digital-to-analog converter (DAC) 32. Remote unit 18 includes IR receiver circuitry 33 and associated transmitter and modulator circuitry, shown generally at 34, for providing return signal 19. The base unit 12 includes return signal circuitry 35 for receiving and processing return signal 19 (or an interface for hardwired link 20) and providing an input to A/D 31 which includes the signal strength level of signal 17 at IR receiver 33.

IR transmitter driver loop 36 includes the IR transmitter and scanner assembly 37 which further includes IR transmitter 38. IR output signal sensor 39 detects the signal strength of signal 17 to provide a strength level signal to amplifier/filter 40 and rectifier 41. Error amplifier 42 receives two inputs: (1) a signal indicative of actual signal strength signal via sensor 39 and (2) a control signal from DAC 32. DAC 32 output is a control signal derived from remote unit signal strength data and software which controls microprocessor 30 and represents the "desired" output signal strength from transmitter 38. The output from error amplifier 42 is provided to mixer multiplexer 44 which is fed by oscillator 43. Voltage translator 45 in turn feeds current driver 46 which powers IR transmitter 38. This circuit thus provides for direct control of IR output signal strength by microprocessor 30.

As discussed in the cited co-pending applications, the PAN and TILT optics are rotated by a mechanical drive which also supplies interrupts 1 and 2 to microprocessor 30 for the START and END of PAN and TILT scan respectively. In the present invention, PAN scans alternative with TILT scans. For each scan, the IR output signal strength is known and the return signal 19 contains information regarding the signal strength at remote unit 18. Using the inverse square law as understood in the art, it is possible to compute the distance between the remote unit 18 and the base unit 12 to a given accuracy depending upon the system specifications which are handled by a system constant, "K", for computational purposes.

Figure 3:
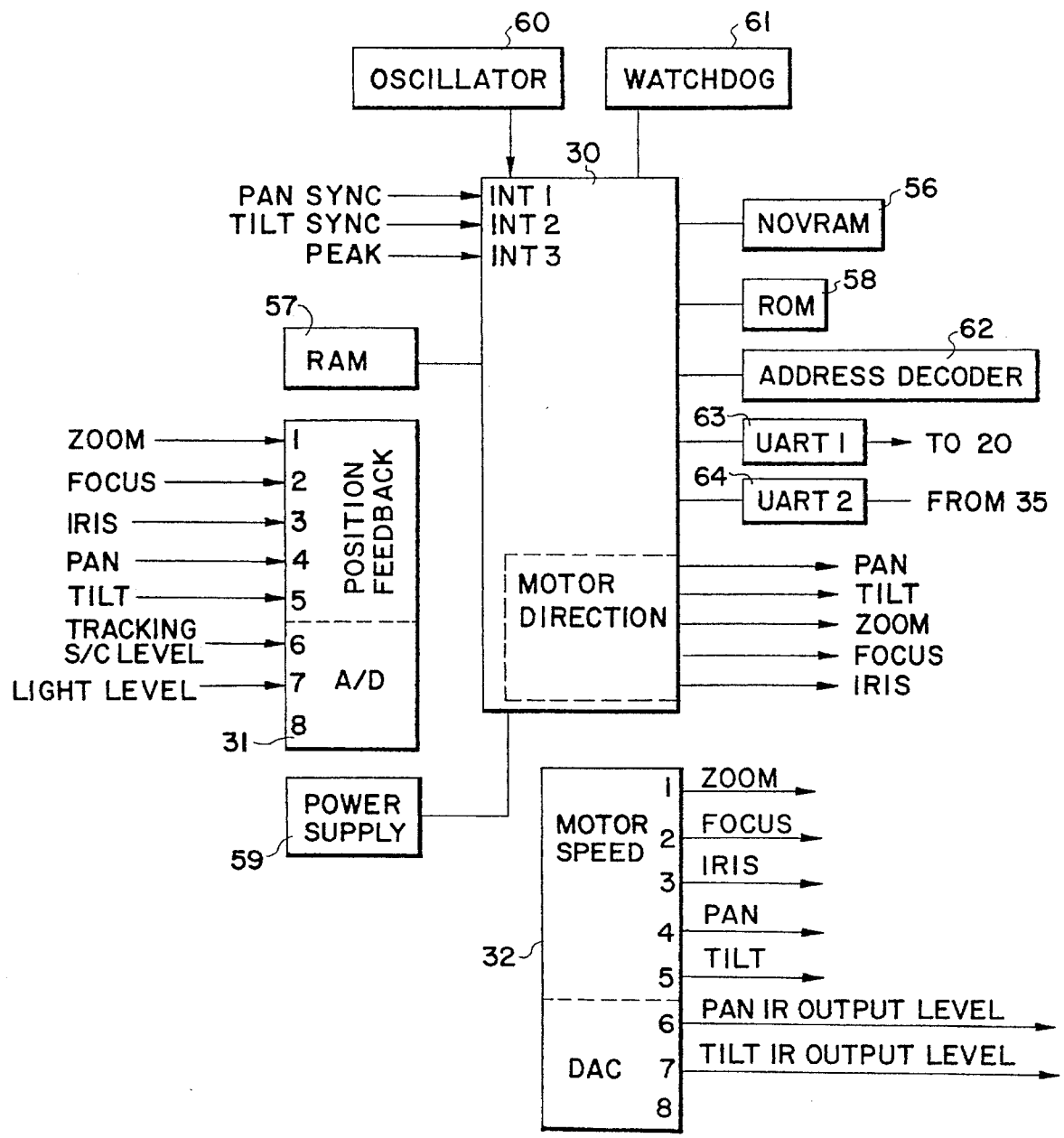
FIG. 3 is a simplified block diagram of the microcomputer-controller of the present invention.
Figure 4:
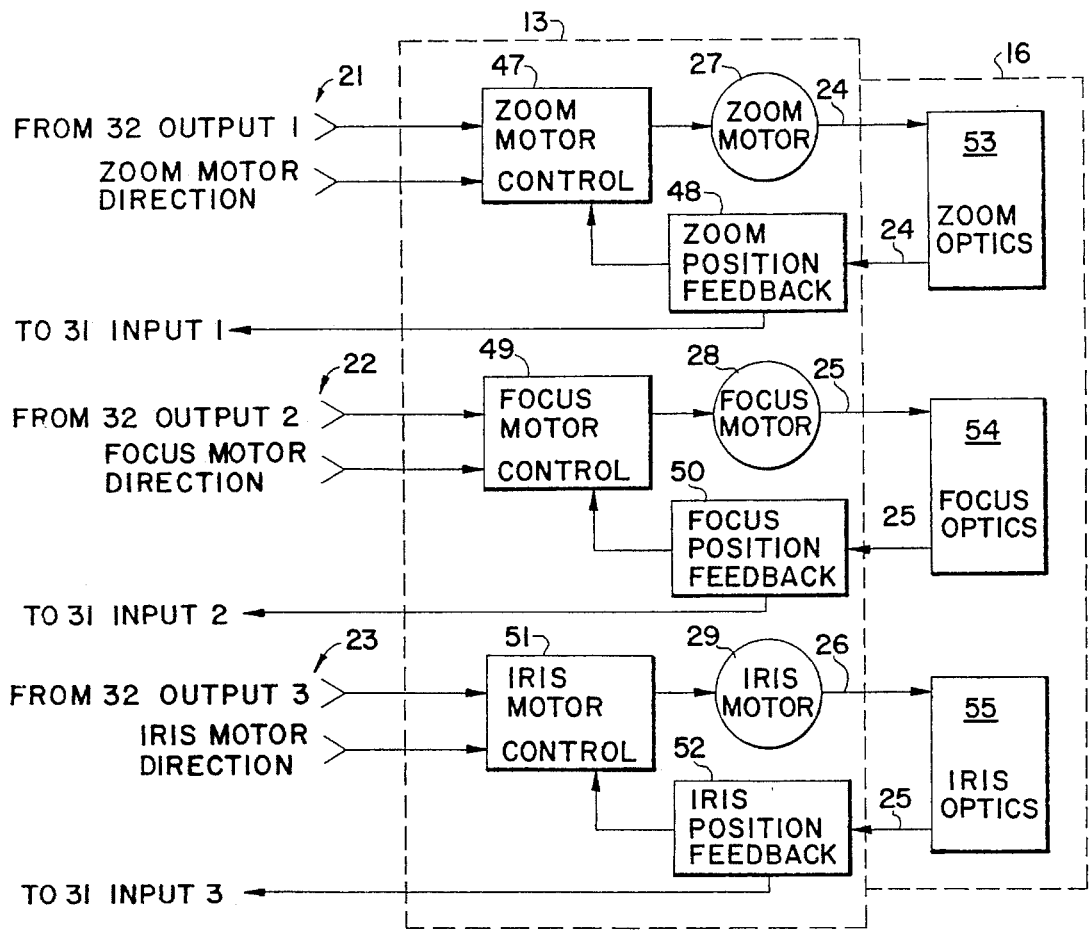
FIG. 4 is a block diagram of the lens control apparatus of FIG. 1.
Figure 5:
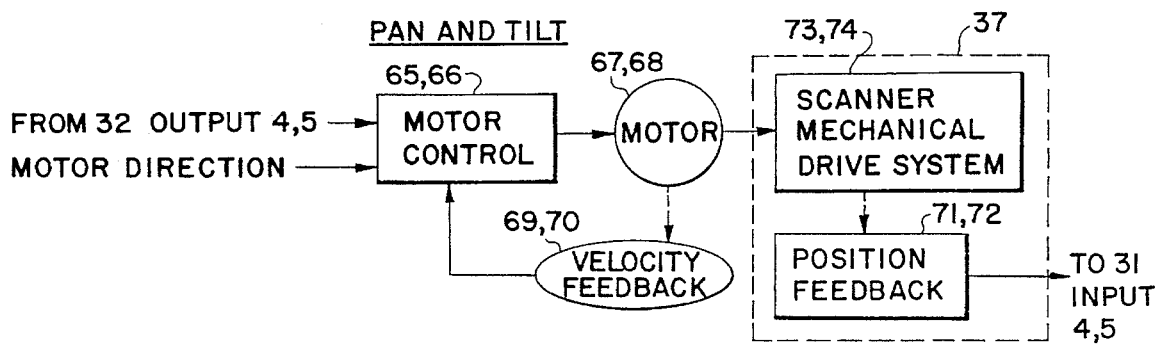
FIG. 5 is a block diagram of the PAN and TILT motor control used in the present invention.

FIGS. 3-5 illustrates the controller of the present invention. Base unit 12 includes a microprocessor 30 which provides motor direction control signals to respective ZOOM, FOCUS, and IRIS motor control circuits 47, 49, 51 which also receive position feedback signals from the corresponding feedback circuits 48, 50, 52. Circuits 48, 50, 52 also differentiate position data to provide a velocity signal to A/D 31. ZOOM optics 53, FOCUS optics 54 and IRIS 55 represent the specific hardware of lens control 16.

Non-volatile memory (NOVRAM) 56 stores various system set-up and configuration parameters which includes: (1) the tracking windows configurations; (2) subject framing data; (3) subject tracking sensitivity; (4) presets; (5) field of view perspective (ZOOM); (6) FOCUS positions; (7) IRIS positions; and (8) various mathematical formulas and look-up tables that relate independent functions to dependent ones. RAM 57 stores data temporarily and ROM 58 stores various system software as understood in the art. Power supply 59, oscillator 60 and address decoder 62 are standard circuits. Watchdog 61 is used to monitor the time it takes to execute routines; the time to complete the main program loop; and bus address as well as other functions to ensure proper operation of the system.

The system employs two UARTS. UART 63 is a hardwired communications link to various external devices, including link 20, if used. UART 64 is used with the preferred RF return signal 19. System commands, as will be discussed, can be entered via either UART.

DAC 32 provides seven outputs: motor speed control signals for the ZOOM, FOCUS, IRIS, PAN and TILT motors and PAN and TILT IR output levels signals as discussed above. A/D converter receives seven inputs: position feedback for the ZOOM, FOCUS, IRIS, PAN and TILT motors; tracking subcarrier signal level from base unit return signal circuitry 35; and light level, which will be discussed with reference to FIG. 8.

Figure 6:
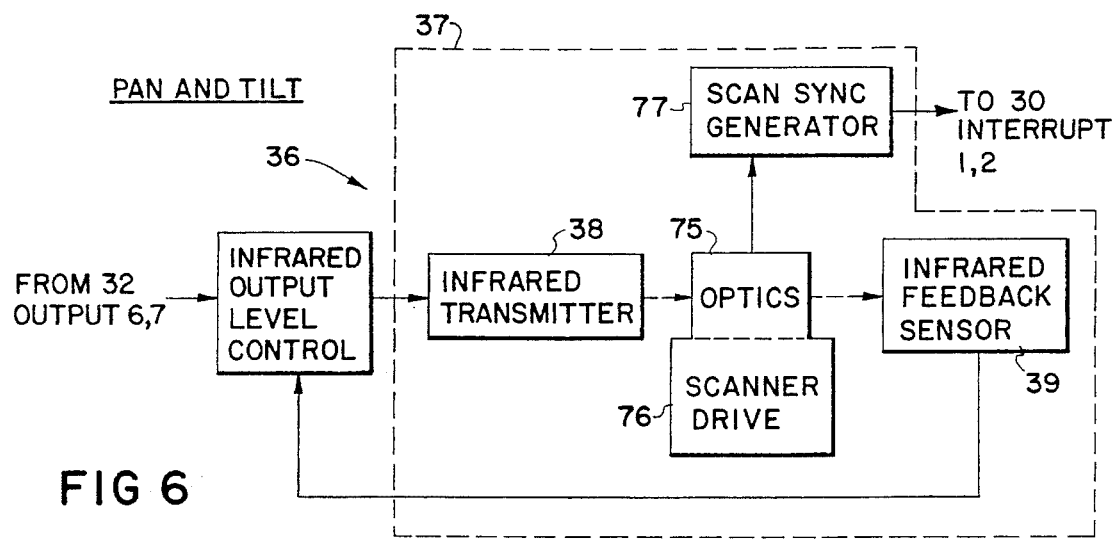
FIG. 6 is a block diagram of some of the mechanical components of the scanning apparatus of the present invention.

FIG. 5 illustrates the identical PAN and TILT drive systems, only one of which will be described for the sake of clarity. Motor control 65 receives a motor speed control signal from DAC 32 and a MOTOR DIRECTION signal from microprocessor 30. Motor 67 provides an input to a velocity feedback circuit (FIG.9) which will be discussed hereinbelow. Scan drive 73 is optically coupled to light-sensing position feedback circuit 71 disclosed in co-pending application '729. FIG. 6 illustrates another aspect of PAN and TILT control with reference to FIG. 2. Scan system 73 includes optics 75 which are rotated by mechanical drive 76 having a rotatable scan sync generator 77 which works with microprocessor 30 to provide interrupts (FIG. 3). Infrared feedback sensor 39 is physically located within the transmitter/spinner assembly 37.

Figure 7:
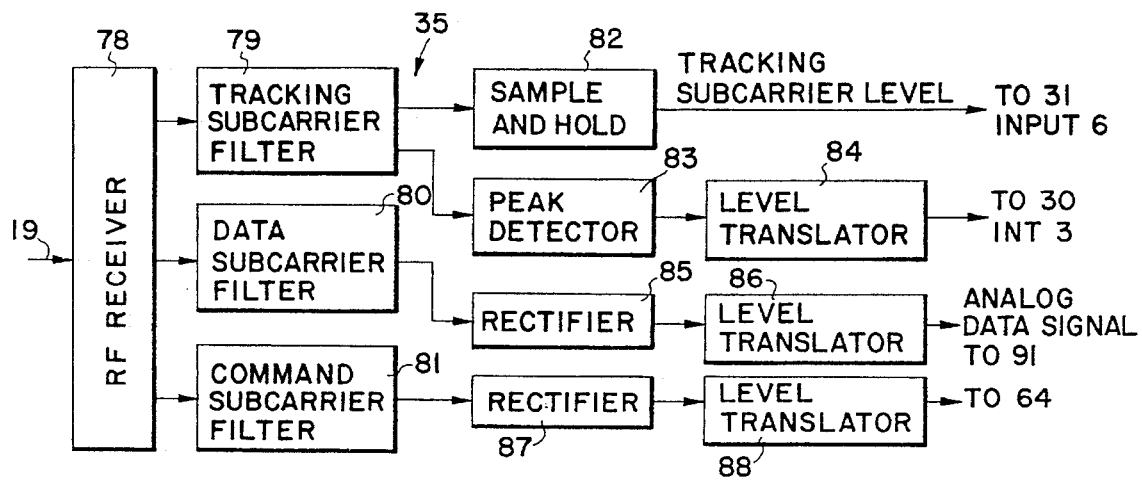
FIG. 7 is a block diagram of the signal separation circuitry used in the base unit of FIG. 1.

FIG. 7 illustrates the return signal circuitry 35 in greater detail. RF receiver 78 provides an output to the tracking, data, and command subcarrier filters 79, 80, 81, respectively. Tracking subcarrier filter 79 provides an output to sample and hold circuit 82 which acts as a buffer and in turn provides an output to A/D converter 31. The tracking subcarrier level is a direct measurement of the strength of IR signal 17 received at remote unit 18. The maximum received subcarrier level during a scan is dependent on several factors subject to correction by calibration including the circuit characteristics of gain and the like, and on the IR output level and distance. As discussed hereinabove, the distance can be calculated by way of IR output level and tracking subcarrier level. The equation solved is:

$$\frac{\text{Infrared Output Level}}{\text{distance}^2} \cdot K = \text{Tracking Subcarrier Level}$$

or $$\text{distance} = \left( \frac{(\text{Infrared Output Level} \cdot K)}{(\text{Tracking Subcarrier Level})} \right)^{1/2}$$

Microprocessor 30 utilizes a PID-type algorithm to select the new desired output level (from DAC 32). The microprocessor includes data regarding past tracking subcarrier levels.

As discussed hereinabove, "peak" IR signal strength is also a detectable signal and is provided from filter circuit 79 to peak detector 83 and to conventional logic level translator 84 to INT 3 on microprocessor 30 for use in determining the exact alignment of base unit 12 scans and the remote unit 18.

Data subcarrier filter circuit 80 provides an output signal to rectifier 85 and level translator 86. In the present invention, any data at remote unit 18 can be sent via the data subcarrier filter. This data preferably includes the output of a remote light sensor circuit which is transmitted for use in IRIS control as will be discussed.

Command subcarrier filter 81 provides outputs to rectifier 87 and level translator 88 to UART 64. These outputs include all commands sent from remote unit 18.

RF receiver 78 may also provide an audio signal. In the preferred embodiment of the present invention, remote unit 18 includes an audio mic and associated FM transmitter circuitry.

Figure 8:
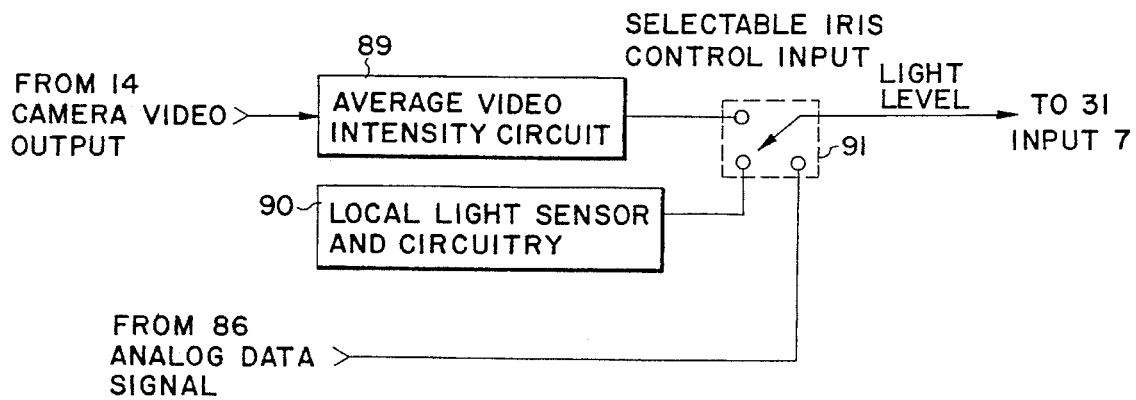
FIG. 8 is a block diagram of the light-level measuring system of the present invention.

FIG. 8 illustrates the selection of three possible light level signals for use in IRIS control. The average video intensity circuit 89 takes the video output from camera 14, averages the luminance information and translates the signal to a DC level. Actual light level is derived from either a local light sensor circuit 90 or the data signal from circuit 86 that is derived from a remote sensor. Switch 91 is used to select the source of the light level sensor signal supplied to A/D convertor 31.

From the foregoing it can be seen that lens control apparatus 16 is completely under the control of microprocessor-driven base unit 12. Algorithms are provided for the complete control of ZOOM, FOCUS and IRIS to provide for the desired position change and the rate of position change of the lens system. For example, as will be discussed hereinbelow, the speed of convergence of the ZOOM, FOCUS and IRIS functions from one position to another can be controlled to work together for the smoothest performance needed in a particular application.

Figure 9:
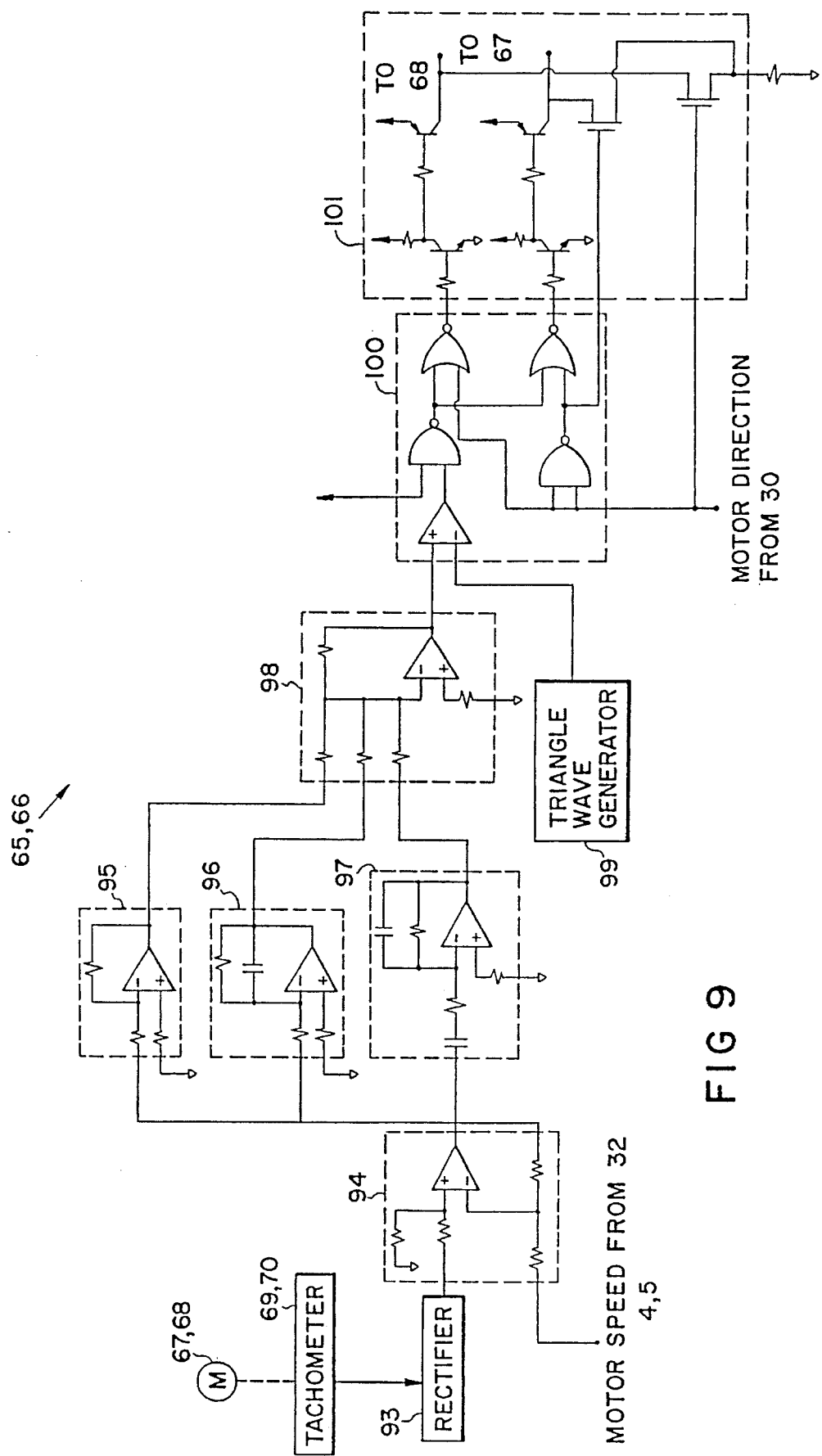
FIG. 9, 9A are block diagrams of the circuitry of motor control of FIG. 5.

FIG. 9 illustrates the velocity feedback and motor control circuitry used with the PAN and TILT motors 67, 68, which are identical. Velocity feedback circuits 69, 70 include a tachometer which in turn provides an output to a rectifier 93. The rectifier 93 provides a DC output to comparator amplifier 94 which provides an output to three circuits in parallel for the purposes of PID control: proportional amplifier 95; integrator amplifier 96; and differentiator amplifier 97. Amplifiers 95–97 provide their respective output signal to summing amplifier 98 which in turn provides an output that is compared with the signal from triangle wave generator 99 in controller circuitry 100. Controller 100 also receives SCAN ENABLE and MOTOR DIRECTION signals from the microprocessor 30. Motor driver circuit 101 actually powers the respective motor 67, 68.

Figure 9A:
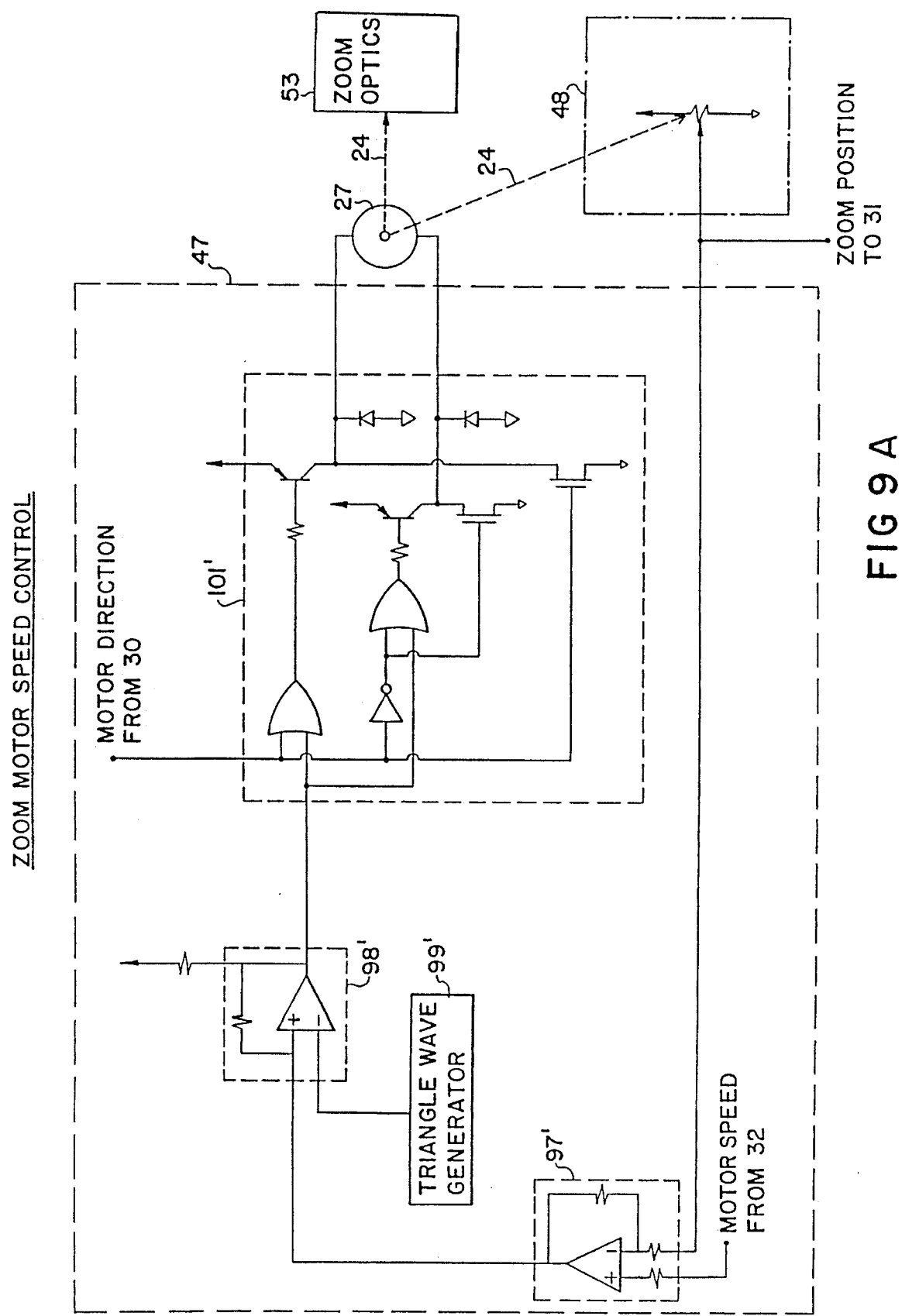

FIG. 9A illustrates the ZOOM motor speed control circuitry in simplified schematic form. The motor driver circuit 101' receives a MOTOR DIRECTION signal from microprocessor 30 and an input from voltage comparator 98' which receives inputs from triangle wave generator 99' and differentiator 97' which combines ZOOM motor speed from DAC 32 and ZOOM position from zoom feedback circuitry 48.

Figure 10:
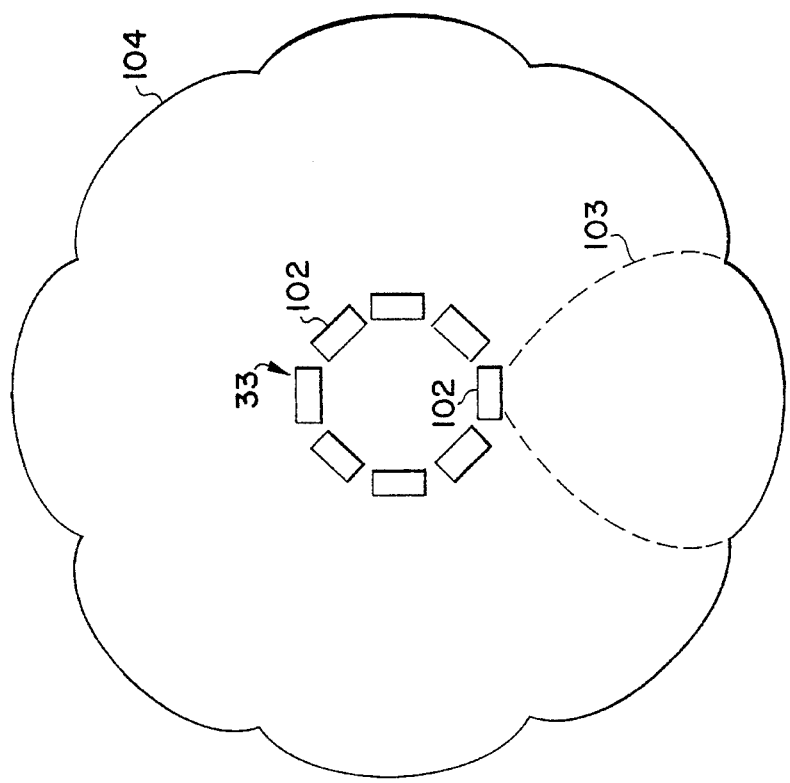
FIG. 10 is a top view of the reception sensitivity of the sensors in the remote unit of FIG. 1.

FIG. 10 illustrates an important feature of the remote unit sensor arrangement. As discussed above, remote unit 18 includes a remote IR receiver 33. FIG. 10 illustrates that the IR receiver 33 includes eight IR sensors 102 arranged in an octagon to provide that the sensitivity lobes or patterns 103 of individual sensors will provide an overall total reception sensitivity profile 104 that is relatively "smooth" throughout a 360 degrees range. A side view of the sensor array would show substantially the same profile. This basic layout provides for constant sensor sensitivity regardless of remote unit orientation. Accordingly, the tracking subcarrier signal level provided to microprocessor 30 will not vary with unit position except with regard to distance. This design minimizes errors in distance calculation.

SYSTEM OPERATION

FIG. 11 illustrates in simplified form the programming for "soft presets". The system has available at all times the PAN and TILT positions. When a tracking command is received by base unit 12, via the return signal 19 or some other device via UART 63 that causes the cessation of tracking, the microprocessor 30 will read and store the PAN and TILT position feedback information. When a command is received to return base station 11 to the tracking mode, the base unit 12 will move to the last known position of remote unit 18 by using the stored position data.

Two programmable options are provided to enhance the performance of the soft preset software. One option allows the user to select the number of degrees beyond the stored PAN and TILT position that the base unit 12 can move when tracking is reselected. Another option provides for movement in "pan only" to reacquire tracking data from the remote unit 18. Accordingly, when tracking is reselected, base unit 12 will move to the last known location of remote unit 18 as indicated by stored PAN and TILT position data and reacquire return signal 19 and resume automatic tracking. FLAG 1 keeps PAN and TILT position data from being overwritten during the time tracking has ceased until new tracking data is acquired and automatic tracking resumes. FLAG 2 is used to signal to microprocessor 30 that the search for tracking data has ended without the locating of the remote unit 18. The system includes several options for the next course of action; (1) reverse direction and continue search; (2) stop and wait for a command; and (3) send an error command from UART 63 to an external device associated with the system.

Other features illustrated in FIG. 11 include a program to adjust PAN and TILT motor speeds with reference to the error between the present position and the stored (desired) position. Finally, a programmable "offset" can be added to the stored PAN and TILT data for "framing"—changing the desired location of the subject in the camera field of view without changing the tracking algorithm. ("Framing" has been referred to as "Offset" in prior co-pending applications.)

The present system is designed to track a subject (such as remote unit 18) and to automatically adjust the camera field of view, ZOOM, FOCUS, IRIS, subject position within the field of view, tracking sensitivity (rate of error elimination), and the size and shape of windows or zones all with regard to predetermined criteria such as the distance between the remote unit 18 and base station 11 and the location of remote unit 18 within an area or room.

A tracking window is defined as the number of degrees from a reference of 0 degrees that the subject may move before the base unit 12 moves. The size of a window may be programmed by the user or automatically controlled by the system. Window size is one of several variables in the system that can be programmed as shown in Table 1.

TABLE 1

| VARIABLES | PROGRAMMABLE STATUS |
| --- | --- |
| Distance | independent |
| Angular Tracking Zone | independent or dependent |
| Manual Override Speed | dependent |
| Focus | dependent |
| Iris | dependent |
| Zoom Perspective | independent or dependent |
| Framing | independent or dependent |
| Window Size | independent or dependent |
| Tracking Sensitivity | independent or dependent |
| Angular Range | independent or dependent |

Figure 12:
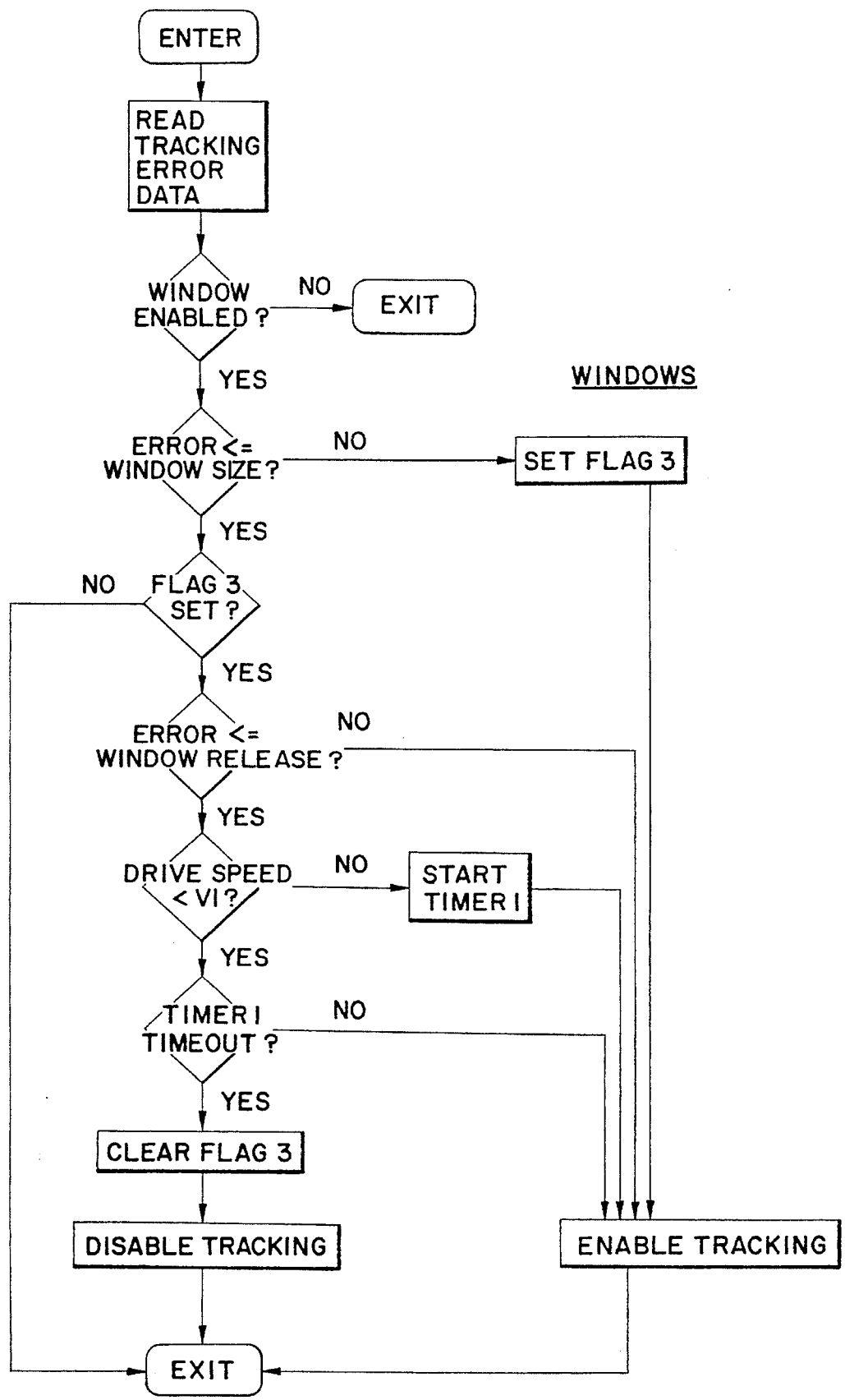
FIG. 12 is a flow chart of a windows algorithm used in the present invention.

FIG. 12 illustrates a windows algorithm. V1 is motor speed. Drive speed must be less than this speed for the duration of timer T 1 or tracking will continue. V1 is adjusted for distance.

Independent and dependent variables are linked together by mathematical relationship or a look-up table. When an independent function is changed, the system may adjust any dependent function of the "link list" of the independent function.

Link lists in their simplest form declare which dependent variables will be automatically controlled by an independent variable. Example 1 shows the distance as the independent variable and ZOOM and FOCUS as dependent variables. Both ZOOM and FOCUS will be adjusted automatically when distance changes. An additional system constraint may require that tracking windows be controlled by ZOOM, not distance since this determines the specifics of the field of view of a camera. The hierarchal structure of the link list allows the system to be controlled with more than one independent variable by having more than one link list. Link list 2 has ZOOM as an independent variable and framing, tracking windows, and tracking sensitivity as dependent variables. The system will support as many lists as required.

EXAMPLE 1

LINK LIST 1

| Independent Variable: | Distance |
|---|---|
| Dependent Variables: | (1) ZOOM |
|  | (2) :FOCUS |

LINK LIST 2

| Independent Variable: | Zoom |
|---|---|
| Dependent Variables: | (1) FRAMING |
|  | (2) TRACKING WINDOWS |
|  | (3) TRACKING SENSITIVITY |

The operation of Example 1 works as follows: Link List 1 will cause the ZOOM perspective to be automatically adjusted by the system as the distance between remote unit 18 and base unit 12 changes. The amount of adjustment will depend on the look-up table or formula that correlates the two. FOCUS is related to both distance and ZOOM. Thus, FOCUS will be automatically adjusted if either distance or ZOOM changes. The colon (:) before the FOCUS variable instructs the system to use all previously listed variables in the link list as inputs for the look-up table. The microprocessor 30 will use both distance and ZOOM data to look up the required FOCUS position and, as will be explained, will interpolate between stored positions. Look-up tables are programmed via UART 63. Alternatively, a mathematical formula can be substituted for a table. The formula would also be loaded via UART 63.

Link list 2 relates any change in ZOOM perspective to the FOCUS, framing, tracking windows, and tracking sensitivity. These dependent variables will keep the subject where desired in the field of view of camera 14. Example 2 illustrates a further use of the link list concept. ZOOM will not be adjusted automatically in the configuration but if the ZOOM perspective is changed by command, for example, framing, tracking window size and tracking sensitivity will be modified as programmed. FOCUS will be automatically changed with distance.

EXAMPLE 2

LINK LIST 1

| Independent Variable: | Distance |
|---|---|
| Dependent Variable: | Focus |

LINK LIST 2

-continued

| Independent Variable: | Zoom |
|---|---|
| Dependent Variables: | (1) Framing |
|  | (2) Tracking Windows |
|  | (3) Tracking Sensitivity |

Some variables are active only when the system is in an automatic tracking mode. When the base unit 12 is not in automatic tracking the distance, framing, windows, and tracking sensitivity data is not used.

Location presets move the base unit 12 to a pre-programmed (remembered) PAN and TILT position utilizing PAN and TILT position data. A location preset will also move FOCUS and ZOOM to the position they were set to at the preset position. IRIS can also be programmed to move in the same manner as FOCUS and ZOOM or it can continue operation in response to light level.

Base unit 12 can also be programmed to automatically change linked variables such as ZOOM, FOCUS, IRIS, framing, window and tracking sensitivity when the base unit 12 is at a particular PAN and TILT position or range of position. For example, base unit 12 may use the setup of Example 1 over a first given range (in degrees) and use some other configuration at a given second range outside of the first range.

Figure 13:
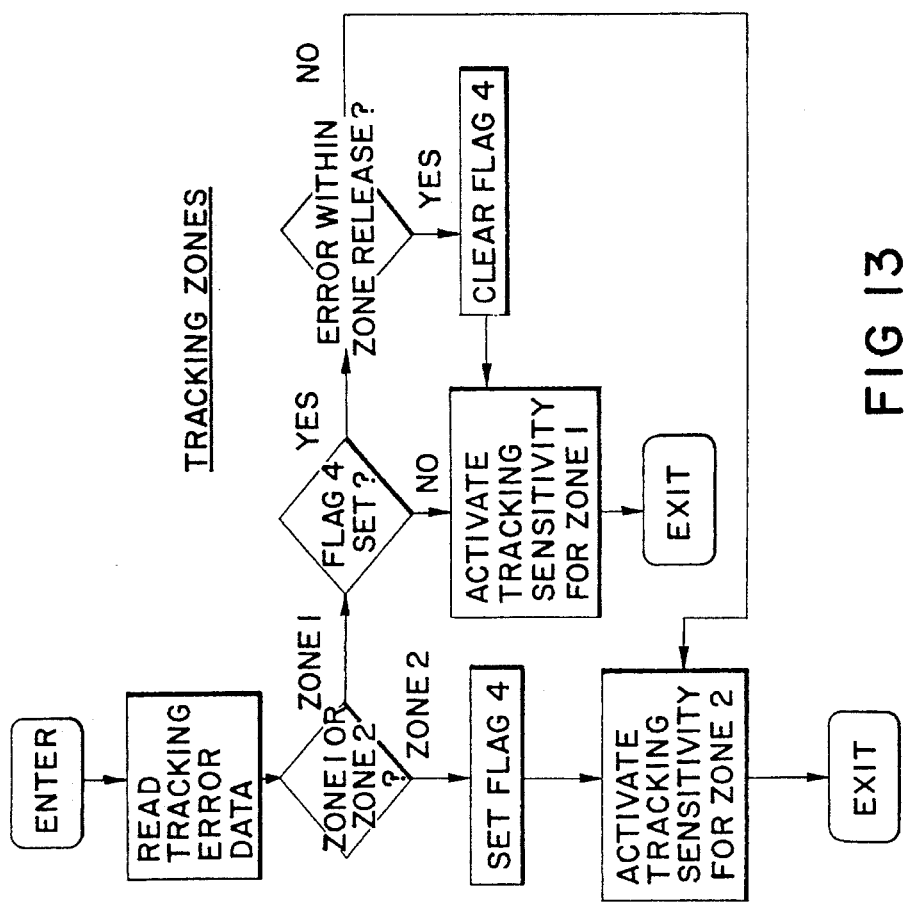
FIG. 13 is a flow chart for the tracking zones algorithm of the present invention.

Angular tracking zones are defined in terms of error in position from the desired position and is expressed in degrees. Generally speaking, each angular tracking zone will have a different tracking sensitivity such that the rate of error elimination varies with tracking zone (FIG. 13). The system can provide for as many such zones as desired.

Examples 3 and 4 illustrate the creation of look-up tables manually. Alternatively, the table can be down-loaded via UART 63 from an external device such as a computer which may include the operating characteristics of several lenses.

EXAMPLE 3

| ZOOM -- Tracking Sensitivity, pan window size |  |
|---|---|
| Create the following link list: |  |
| independent variable: | ZOOM |
| dependent variables: | tracking sensitivity |
|  | PAN window size |

Steps

1 Adjust the ZOOM to a desired perspective

2 Adjust the tracking sensitivity

3 Adjust the PAN window size

4 Issue the link list store command

5 Change the ZOOM to another perspective

6 Adjust the tracking sensitivity

7 Adjust the PAN window size

8 Issue the link list store command

9 Repeat steps 5, 6, 7 and 8 until all desired perspectives are entered.

EXAMPLE 4

| |
|---|
| Distance -- Zoom, Focus |
| Create the following link list: |
|     independent variable:   distance |
|     dependent variables:   ZOOM |
|                                   :focus |

Steps

1 Stand at a given distance from the base unit

2 Adjust the ZOOM to a desired position

3 Adjust the FOCUS.

4 Issue the link list store command

5 Change the ZOOM to another perspective

6 Adjust the FOCUS

7 Issue the link list store command

8 Repeat steps 5, 6 and 7 until all desired ZOOM perspectives are entered

9 Stand at a different distance from the base unit

10 Repeat steps 2, 3, 4, 5, 6, 7 and 8

11 Repeat steps 9 and 10 until distance range and/or resolution is covered.

The interpolation method used between stored data points is selectable and may be linear, exponential, logarithmic or polynomial to correspond to any given optical arrangement.

Other features of the system include a "return to tracking ZOOM perspective". When tracking is turned off either by commands to cease tracking or commands such as location presets which turns off automatic tracking, the current ZOOM perspective is stored in NOVRAM 56. When tracking is resumed, the ZOOM and its linked variables will return to their positions or values that existed before tracking was disabled. If ZOOM is linked to distance, the base unit 12 will adjust the ZOOM to return to the desired perspective (not position) when tracking was disabled.

As discussed in the copending application the remote unit 18 has the capability to transmit a PAN/TILT override. The speed of the override can be linked to the ZOOM perspective. Accordingly, PAN/TILT override speed can be changed when the ZOOM perspective is changed. The preferred method to be employed with this feature is to increase the manual override speed as the ZOOM perspective moves from "tight" to "wide". The result is faster movement when it is needed.

TABLE 2

VARIABLES

DEPENDENT

1. Override Speed (PAN/TILT)
2. FOCUS
3. IRIS

DEPENDENT OR INDEPENDENT

4. ZOOM perspective
5. Framing
6. Window Size (PAN/TILT)
7. Tracking Sensitivity
8. Angular Range
9. Angular Tracking Zone

INDEPENDENT

10. Distance

TABLE 2-continued

LIST EXAMPLES

A. Distance: 1–9
B. Angular Tracking Zone: 1–8, 10
C. ZOOM Perspective: 1–3, 5–9
D. Framing: 1–4, 6–9
E. Window Size: 1–5, 7–9
F. Tracking Sensitivity: 1–6, 8–9
G. Angular Range: 1–7, 9

In order to describe the programmed functions of the present invention, Table 2 presents the system variables in a form that will help to clarify the discussion of system operation.

There are seven possible independent variables: (1) distance between the base unit 12 and the remote unit 18; (2) tracking zone, the number of degrees of error over which a particular tracking sensitivity (or rate of error elimination) is in effect; (3) ZOOM perspective; (4) framing (or "offset"); (5) window size, the number of degrees that the remote unit 18 can move in either the PAN and/or TILT axis before the base unit 12 moves; (6) tracking sensitivity, the rate of error elimination; and (7) tracking angular range, the span, with reference to 360 degrees in PAN and 180 degrees in TILT, over which certain values for a given set of variables apply. Three other variables are generally dependent only but can be made independent by simple modifications in the software: override speed, having separate values for PAN and TILT; FOCUS; and IRIS. The lower portion of the table illustrates seven link lists with the independent variable listed first with dependent variables that are available listed below. For example, list A uses "distance" as independent for the purpose of controlling as dependent variables any or all of the variables, 1–9. As discussed previously, any number of link lists may be created and in addition, as was shown in Example 1, link list 1, a dependent variable, such as FOCUS, can be changed in response to change in another dependent variable, ZOOM, (altered by command, for example) or the independent variable used, distance. Accordingly, the programmable capability of the present invention provides for almost any arrangement of the variables for overall control as well as unusual combinations of the variables to create special optical effects which may be desired in the circumstances.

The methodology thus employed in system operation includes the following steps. First, independent and dependent variables are established. Second, the dependent variables that are to be automatically controlled by specific independent variables are selected (by way of the creation of a link list). Third, the relationship between an independent variable and a dependent variable is established by way of a look-up table or mathematical relationship or whatever other means may be chosen. The system will then automatically change the value of the dependent variable(s) whenever the value of the independent variable is changed in accord with the established relationship between them.

Dependent variables can also be established as a second alternate independent variable for a further second class of dependent variables through the use of the programming step of establishing that all previously established variables—independent or dependent—be used to automatically control the value of the second class of dependent variable. Finally, variables may be used in more than one link list and some variables may be independent, alternatively independent, or dependent in one link list and be otherwise in another list. In all steps, the results established are stored in memory.

Figure 14:
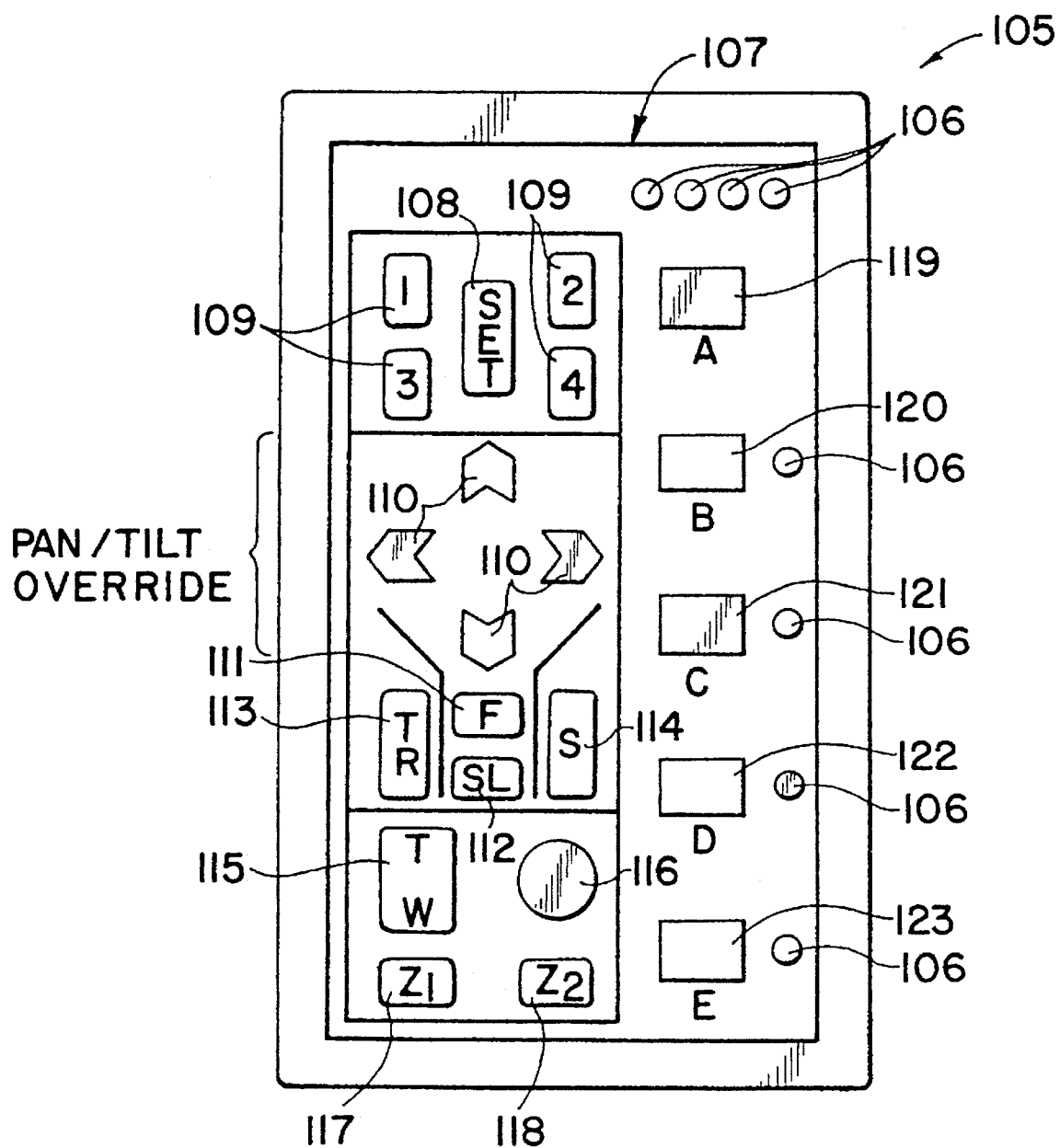
FIG. 14 is a front view of the command generator of the present invention.

With reference now to FIG. 14, the preferred embodiment of the remote unit 18 is described. The copending applications disclose a remote unit in the form of a hand-held wand. The wand includes the IR sensors and RF return signal capability and thus has the function of operating as a tracking unit. The wand also included, as discussed above, the capability to issue commands to the base unit 12. The present invention contemplates physically separating the tracking function from the command function. Thus, the tracked subjects may or may not control the command function. A director, for example, may be the only person capable of issuing commands. Moreover, the director himself need not be tracked by the base unit 12. Accordingly, the subject to be tracked will be provided with a tracking unit (FIG. 15) which includes one or more IR sensor pods and a connected tracking unit module which can be kept out of sight of a camera if so desired and which contains battery power and the like. Control of the base unit 12 and the operation of an associated camera 14 is accomplished via (3) a command generator 105 (FIG. 14).

FIG. 14 illustrates the command generator 105. The generator 105 is a modified version of the wand discussed in the co-pending applications and includes 8 indicating lights 106 and the following 23 switches as part of keypad 107. SET switch 108 is used with 4 LOCATION PRESET buttons 109 to store 4 field of view positions of base unit 12 for further use. PAN/TILT OVERRIDE buttons 110 override the automatic tracking functions of base unit 12 and are used for manual control of unit 12. FAST and SLOW switches 111, 112 are used to adjust base unit 12 speed in movement and tracking sensitivity to a stored preset position. AUTOTRACK switch 113 establishes automatic tracking. STEALTH switch 114 is used to establish the stealth function. ZOOM rocker 115 is used for manual control of the ZOOM lens. Z1 and Z2 switches 117, 118 are used for ZOOM presets with SET switch 108. ON/OFF switch 116 is conventional. The switches to the side, CAMERA/A; ALT/B; FOCUS/C; IRIS/D AND FRAME/E are used with programming as will be discussed hereinbelow. Electronically, command generator 105 is substantially identical to the remote unit and wand of the copending applications with the exception of the IR sensor capability. The command generator 105 transmits commands by RF signaling and is controlled by a microcomputer having conventional NOVRAM memory. Additional system commands are listed below.

COMMANDS AND CONTROL

Commands to the base unit 12 can be either transmitted from command generator 105 or by external communication via UART 63. The following is a description of additional control functions that can originate with command generator 105.

1. PAN and TILT sensitivity are only adjustable together at generator 105 using the ON/OFF button 116 and the FAST and SLOW buttons 111, 112 to increase or decrease sensitivity.

2. ZOOM presets are established by using SET button 108 and ZOOM PRESET buttons Z1, Z2 with and without kit button 120 to create four presets. A preset is recalled by simply pushing the appropriate ZOOM PRESET buttons.

3. ZOOM direction is controlled by ZOOM rocker 115.

4. FOCUS is adjusted by pressing FOCUS button 121 and then changing focus with ZOOM rocker 115. The FOCUS that exists at a given ZOOM position is automatically stored when a ZOOM preset is stored and will automatically be recalled when a ZOOM preset is recalled.

5. IRIS is controlled as focus but through the use of IRIS switch 122.

6. PAN and TILT OVERRIDE speed are only adjustable together at generator 105. FAST and SLOW switches 111 and 112 are used to adjust the speed.

7. Framing (previously called "Offset") is adjusted using the FRAME button 123 and the appropriate OVERRIDE button 110 to alter the field of view position reference via a framing word stored with the associated ZOOM PRESETS.

8. A command to FLIP PAN OFFSET (FRAMING) is accomplished by pressing the ON/OFF switch 116 and TRACK switch 113 simultaneously to shift the PAN OFFSET to the other side of the center reference line.

The following commands are generated only by way of an external communication link via UART 63 or stored in memory once received via UART 63.

A. Distance:
Set distance K factor
read distance
B. Rates of convergence for ZOOM, FOCUS, IRIS
C. Link List:
Set link list number
Set independent variable
Set dependent variable(s)
Store link list(s)
Set end of list
D. Look-up Table:
Set table variables
Set table format
Set table size
Enter table
Set interpolation mode
E. Formulas:
Set formula variables
Enter formula
F. PAN and TILT OVERRIDE speeds (individually)
G. Angular Tracking Zone:
Set zone in degrees
Recall zone
Set tracking sensitivity in degrees
Set zone release in degrees
H. Soft Presets:
Set number of degrees
Set PAN only option
Set reverse direction and continue search option
Set stop option
Set send error command to UART 1
I. Framing word:
Increment/Decrement; Set; and Recall for PAN and TILT (individually)
J. PAN and TILT tracking sensitivity (individually) set and recall
K. PROGRAMMING mode, RUN mode, COMMAND ENABLE and DATA commands for overall system programmed operation.
L. Finally, a number of other commands are necessary in the operation of the system. These include: PAN and TILT WINDOW ENABLE/DISABLE; PAN and TILT WINDOW SIZE (in degrees); PAN VI and TILT VI; timer time-out (in seconds); 0 degree reference for both PAN and TILT; ANGULAR RANGE option ENABLE/DISABLE; and similar commands.

Generally, the use of external communication will be of two types: first, an external computer will be used to load software into memory; and second, information will be supplied to the external computer which will automatically generate commands in response to information monitored by the external device. An example would include soft presets and ZOOM PRESETS. In the preferred embodiment of the inventions, all system commands can be generated and transmitted from an external device such as a computer.

Appendix "A" includes numerical examples of system operation.

Figure 15:
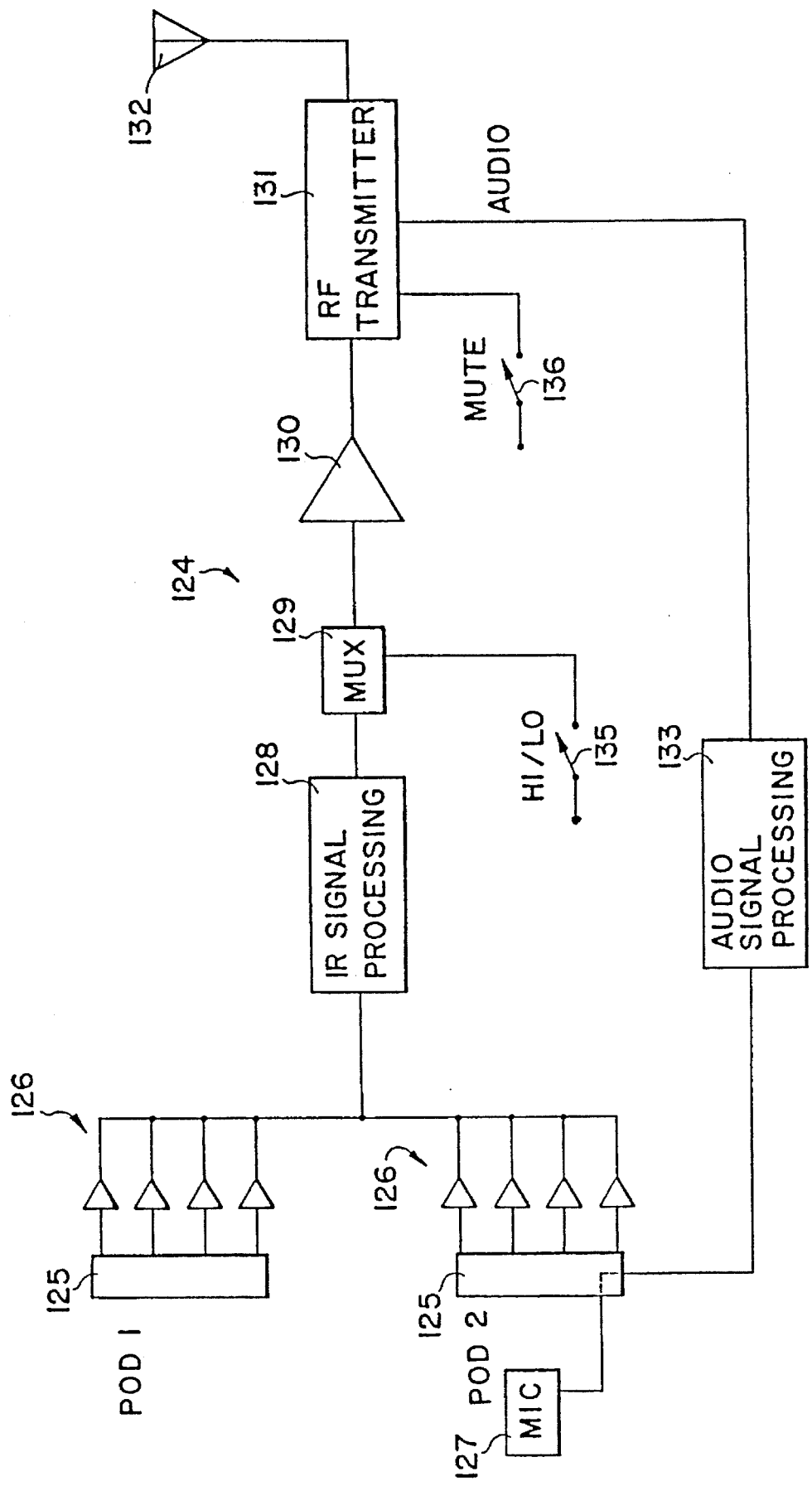
FIG. 15 is a block diagram of the receiver and transmitter unit of the remote unit of the present invention.

The tracking unit 124 is illustrated in simplified schematic form in FIG. 15. Two pods 125 each contain four IR sensors and are designed such that one pod 125 will be worn on the back of a subject and the other pod 125 on the front. This particular arrangement will approximate the octagon-based sensitivity discussed above.

The electronic circuitry in the tracking unit is conventional beginning with IR sensor amplifiers 126, IR signal processing circuitry 128, multiplexer (MUX) 129, amplifier 130, and RF transmitter 131 having antenna 132. Audio is developed from a microphone 127 physically close to POD 2 that provides a standard output to conventional audio signal processing circuitry 133. MUX 129 receives an input from HI/LO switch 135 to provide data in the RF signal 19 to the base unit 12 (FIG. 2) for a "coarse" adjustment of the IR output level of signal 17. Mute switch 136 blocks audio transmission. Pods 125 are preferably worn around the neck of the subject with the remainder of unit 124 hooked to the belt and perhaps out of the field of view of camera 14. As discussed previously, the output from antenna 132 will be an RF signal that includes "peak" data as is the case with remote unit 18.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of automatically controlling the field of view of a camera relative to a specific subject within the field of view of the camera by an automatic control system comprising the steps of:
   A. identifying automatically by the automatic control system the specific subject that is to be within the field of view by detecting the subject;
   B. determining by the automatic control system a relationship of the subject to the field of view of the camera;
   C. controlling the field of view of the camera by the automatic control system in response to the determined relationship of step B; and
   D. determining the distance between the subject and the camera.

2. The method of claim 1 wherein step A includes the step of:
   E. automatically tracking the subject by the automatic control system in at least one plane with the field of view.

3. The method of claim 1 wherein step C includes the steps of:
   E. establishing desired fields of view with respect to the distance between the subject and the camera;
   F. automatically controlling the field of view to automatically maintain the desired fields of view established in step E.

4. The method of claim 3 further comprising the step of:
   G. automatically issuing a command to the automatic control system to select a desired field of view established in step E.

5. The method of claim 4 wherein step F includes the step of:
   H. issuing the command by the subject.

6. The method of claim 1 further including the step of:
   E. establishing and remembering a plurality of fields of view.

7. The method of claim 6 wherein step E includes the step of:
   F. issuing a command to the automatic control system to recall and maintain one of the desired fields of view remembered in step E.

8. A method of automatically controlling the focus of the field of view of a camera by an automatic control system relative to a subject comprising the steps of:
   A. automatically identifying the subject by the automatic control system by detecting the subject;
   B. establishing a desired focus relative to the subject; and
   C. automatically controlling the focus of the field of view by the automatic control system in response to a determined relationship between the subject of step A and the automatic control system.

9. The method of claim 8 wherein step B includes the step of:
   D. determining the distance between the subject and the camera.

10. The method of claim 8 wherein step A includes the step of:
    D. automatically tracking the subject to the automatic control system in at least one plane with the desired field of view.

11. The method of claim 8 wherein step C includes the step of:
    D. automatically issuing a command to the automatic control system to select a desired focus established in step B.

12. The method of claim 11 wherein step D includes the step of:
    E. issuing the command by the subject.

13. The method of claim 8 further including the step of:
    D. establishing and remembering a plurality of focus settings.

14. The method of claim 13 wherein step D includes the step of:
    E. issuing a command to the automatic control system to recall and maintain one of the desired focus settings remembered in step D.

15. A method of automatically controlling the field of view and field of view focus of a camera by an automatic control system with reference to a subject comprising the steps of:
    A. automatically determining a relationship of the subject to the field of view of the camera;
    B. establishing a desired field of view;

C. establishing a desired field of view focus;

D. controlling the field of view and focus by the automatic control system in accordance with step A.

16. The method of claim 15 wherein step A includes the step of:

E. determining the distance between the subject and the camera.

17. The method of claim 15 wherein step A includes the step of:

F. automatically tracking the subject in at least one plane with the field of view.

18. The method of claim 15 further including the step of:

E. remembering a plurality of fields of view established in step B.

19. The method of claim 15 further including the step of:

E. remembering a plurality of field of view focuses established in step C.

20. The method of claim 18 further including the step of:

F. automatically selecting the focus for each field of view.

21. The method of claim 20 further including the step of:

G. issuing a command to the automatic control system to recall a field of view remembered in step E and automatically selecting the focus for the recalled field of view.

22. The method of claim 21 wherein step G includes the step of:

H. issuing the command by the subject.

23. The method of claim 3 wherein step D includes the steps of:

F. determining the actual error in position of the subject with respect to the field of view of the camera with respect to a reference established by the automatic control system;

G. establishing a desired location of the subject with respect to the field of view of the camera; and H. automatically controlling the field of view by the automatic control system of the camera to maintain the subject at the desired location with respect to the field of view.

24. The method of claim 23 wherein step H includes the step of:

I. establishing a plurality of tracking zones wherein each tracking zone is defined by an error measured from a desired location of the subject relative to the field of view.

25. The method of claim 24 wherein step I includes the step of:

J. establishing a specific rate at which the error between the subject and the desired location is reduced in each tracking zone established in step I.

26. The method of claim 24 further including the step of:

J. automatically adjusting the tracking zones of step I to maintain a desired tracking zone area relative to the subject independent of distance.

27. The method of claim 24 further including the step of:

K. automatically controlling the rate at which the error is reduced within each tracking zone.

28. The method of claim 27 further including the step of:

L. maintaining the highest error reduction rate associated with a tracking zone that the subject has entered until the error has been substantially eliminated.

29. A method of automatically controlling the field of view of a camera relative to a subject within the field of view of the camera by an automatic control system comprising the steps of:

A. determining a relationship of the subject to the field of view of the camera;

B. establishing a plurality of desired fields of view;

C. controlling the field of view by the automatic control system to provide and maintain the desired fields of view established in step B.

D. determining the actual location of the subject with respect to the field of view of the camera;

E. establishing a desired location of the subject with respect to the field of view of the camera;

F. controlling the field of view of the camera by the automatic control system to automatically track the subject by reducing the error in position in the field of view between the actual location determined in step D and a desired location established in step E; and G. establishing a tracking zone for each field of view established in step B wherein each tracking zone is defined by an area measured in terms of distance and angle from a reference that represents a desired location of the subject relative to the field of view established in step E.

30. The method of claim 29 wherein step G includes the step of:

H. establishing a specific rate at which the error in position between the subject and the field of view is reduced in each tracking zone established in step G for a respective field of view.

31. The method of claim 29 wherein step C includes the steps of:

H. selecting a desired field of view established in step B;

I. automatically selecting a tracking zone for the selected field of view of step G; and J. automatically tracking the subject with the field of view of the camera.

32. The method of claim 31 wherein step J includes the step of:

K. reducing the error at the rate established for the selected tracking zone.

33. A method of automatically controlling the control functions used in an automatic control system that controls the field of view of a camera comprising the steps of:

A. automatically determining the error of a subject relative to a reference;

B. automatically determining the distance between a subject and the reference of step A;

C. automatically determining the relationship between the subject and the field of view;

D. selecting which of one or more control functions used for the control of the automatic control system and control of the camera field of view are to be automatically changed in response to changes in distance;

E. establishing a relationship between the distance and the control function selected in step D that determines how the control functions are to be changed in response to changes in the distance; and F. automatically controlling one or more functions by the automatic control system in response to changes in the distance in accordance with the respective relationship established in step E.

34. The method of claim 33 wherein step C includes the step of:

F. selecting one or more control functions from the following list:
1. camera field of view;
2. camera focus;
3. camera iris;
4. tracking window size in PAN and/or TILT plane;
5. tracking sensitivity;
6. angular tracking range;
7. override speed in PAN and/or TILT plane;
8. framing; and
9. angular tracking zone.

* * * * *